(12) United States Patent
Chen et al.

(10) Patent No.: US 9,800,381 B2
(45) Date of Patent: Oct. 24, 2017

(54) METHOD, APPARATUS AND SYSTEM FOR CONFIGURING DEMODULATION REFERENCE SIGNAL

(75) Inventors: Wenhong Chen, Beijing (CN); Deshan Miao, Beijing (CN); Rakesh Tamrakar, Beijing (CN)

(73) Assignee: Chine Academy of Telecommunications Technology, Beijing (CN)

( * ) Notice: Subject to any disclaimer, the term of this patent is extended or adjusted under 35 U.S.C. 154(b) by 262 days.

(21) Appl. No.: 13/638,240

(22) PCT Filed: Apr. 25, 2011

(86) PCT No.: PCT/CN2011/073265
§ 371 (c)(1),
(2), (4) Date: Sep. 28, 2012

(87) PCT Pub. No.: WO2011/134377
PCT Pub. Date: Nov. 3, 2011

(65) Prior Publication Data
US 2013/0022087 A1    Jan. 24, 2013

(30) Foreign Application Priority Data

Apr. 30, 2010   (CN) .......................... 2010 1 0164433
Jul. 26, 2010    (CN) .......................... 2010 1 0239193

(51) Int. Cl.
*H04L 5/00*       (2006.01)
*H04L 27/26*      (2006.01)
*H04J 13/00*      (2011.01)

(52) U.S. Cl.
CPC ........ *H04L 5/0051* (2013.01); *H04J 13/0074* (2013.01); *H04L 5/0094* (2013.01); *H04L 27/2613* (2013.01); *H04L 5/0026* (2013.01)

(58) Field of Classification Search
CPC ............ H04J 2011/0003; H04L 5/0051; H04L 13/0074; H04L 5/0094; H04L 27/2613; H04L 5/0026
See application file for complete search history.

(56) References Cited

U.S. PATENT DOCUMENTS

2010/0067512 A1* 3/2010 Nam et al. .................... 370/342
2011/0206089 A1* 8/2011 Cho .................... H04J 13/0048
                                                            375/141

(Continued)

FOREIGN PATENT DOCUMENTS

WO   WO 2010/032953 A2   3/2010
WO   WO 2010/147853 A2   12/2010

OTHER PUBLICATIONS

Communication pursuant to Article 94(3) EPC for EP Application No. 11774368.2, mailed Nov. 8, 2013.

(Continued)

*Primary Examiner* — Walter DiVito
(74) *Attorney, Agent, or Firm* — Foley & Lardner LLP; James F. Ewing (57) ABSTRACT

A method, an apparatus and a system for configuring a Demodulation Reference Signal (DMRS) are disclosed in the present invention. The method includes: receiving a DMRS indication index transmitted from a network side; determining at least one port used for the local transmission of the DMRS; acquiring the predetermined DMRS configuration parameters corresponding to the DMRS indication index and the at least one port, and configuring, according to the DMRS configuration parameters, the DMRS to be transmitted from the at least one port. Therefore, the terminal can implement the configuration of the DMRS without reloading the corresponding configuration information. Thus, the implementation complexity of the DMRS configuration flow (Continued)

is decreased, and the operation load of the terminal is also reduced.

15 Claims, 3 Drawing Sheets

(56) References Cited

U.S. PATENT DOCUMENTS

| | | | |
|---|---|---|---|
| 2011/0268028 A1* | 11/2011 | Stern-Berkowitz et al. | 370/328 |
| 2011/0286499 A1* | 11/2011 | Panicker et al. | 375/148 |
| 2015/0131427 A1* | 5/2015 | Han | H04L 5/0053 370/210 |

OTHER PUBLICATIONS

Huawei, "Evaluation and discussions on OCC for UL DM RS"; Agenda Item: 6.5.1.1; 3GPP TSG RAN WG1 Meeting #60bis, Beijing, China, Apr. 12-16, 2010; R1-101969.

Qualcomm, Inc., "DM-RS in support of UL spatial multiplexing"; Agenda item: 7.4.1; 3GPP TSG-RAN WG1 #60; Feb. 22-26, 2010, San Francisco, US; R1-101494.

International Search Report for PCT/CN2011/073265 dated Aug. 11, 2001.

QUALCOMM Incorporated: "DM-RS in Support of UL Spatial Multiplexing (doc. No. RI-100691)" 3GPP TSG-RAN WGI #59bis, RI-100691, [Online] (Jan. 22, 2010) [retrieved on Jul. 4, 2011]. <URL: http://www3gpp.org/ftp/tsg ran/WGI RLI/TSGRI 59biDocsiRI-100691.zi11>.

"Evaluation and discussions on OCC for UL DM RS," 3GPP TSG RAN WG1 Meeting #60bis, Beijing, China, Apr. 12-16, 2010.

"DM-RS in support of UL spatial multiplexing," 3GPP TSG-RAN WG1 #60, San Francisco, US, Feb. 22-26, 2010.

\* cited by examiner

Fig. 1

--Prior Art--

Fig. 2

--Prior Art--

METHOD, APPARATUS AND SYSTEM FOR CONFIGURING DEMODULATION REFERENCE SIGNAL

The present application is a US National Stage of International Application No. PCT/CN2011/073265, filed 25 Apr. 2011, designating the United States, and claiming priority to Chinese Patent Application No. 201010164433.2, filed with the State Intellectual Property Office of China on Apr. 30, 2010 and entitled "Method, apparatus and system for configuring DMRS" and Chinese Patent Application No. 201010239193.8, filed with the State Intellectual Property Office of China on Jul. 26, 2010 and entitled "Method, apparatus and system for configuring DMRS", all of which are hereby incorporated by reference in their entireties.

FIELD OF THE INVENTION

The present invention relates to the field of communications and particularly to a method, apparatus and system for configuring a DMRS.

BACKGROUND OF THE INVENTION

At present, Multi-Input Multi-Output (MIMO) has been introduced to a Long Term Evolution-Advanced (LTE-A) system and employs a plurality of antennas at both a transmitter and a receiver for transmission and reception to thereby greatly improve the transmission performance and capacity of the system. MIMO transmission can be enabled in two schemes in uplink transmission: Single-User MIMO (SU-MIMO) and Multi-User MIMO (MU-MIMO), where SU-MIMO utilizes spatial multiplexing to transmit a plurality of data streams of a certain user over the same time and frequency resources, and MU-MIMO utilizes orthogonality between users to transmit data of the users over the same time and frequency resources. The use of MIMO enables doubling of the capacity and the spectrum efficiency of a communication system without any increase in bandwidth.

In SU-MIMO transmission of the prior art, the same time and frequency resources are occupied for a plurality of data streams, and data of each stream can be detected respectively only if an uplink channel corresponding to the each data stream (one data stream corresponds to one uplink port) is obtained by a Demodulation Reference Signal (DMRS); and the same time and frequency resources are occupied for DMRSs of different ports, and the capability of a receiver to estimate a channel of each port respectively is ensured by orthogonality of DMRS sequences. In uplink MU-MIMO transmission, the same resource is occupied for DMRSs of a plurality of users, and also the capability of a receiver to detect a respective channel of each user is ensured by orthogonality of DMRS sequences.

In order to ensure the performance of a system during SU-MIMO transmission or MU-MIMO transmission and reduce inter-layer signal interference or inter-user signal interference, an Orthogonal Cover Code (OCC) can be introduced to ensure orthogonality of DMRS sequences of different layers or different users. Especially with unequal bandwidths of multiplexed users of MU-MIMO, one user can not be distinguished from another by orthogonality of base sequences, and orthogonality can be ensured only with introduction of an OCC. However, an OCC can be suitable only for a non-slot hopping system but can not be useful for a cell with group hopping or sequence hopping. In order to enable an OCC to be used for a user with a demand in a cell, slot hopping of the corresponding user has to be disabled.

Figure 1:
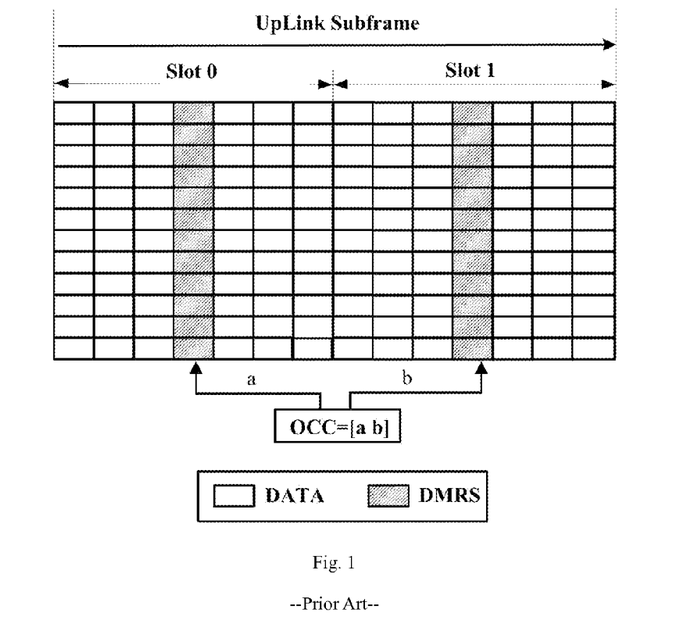
FIG. 1 is a schematic principle diagram of an OCC in the prior art.

For SU-MIMO transmission or MU-MIMO transmission, it will be very difficult to ensure orthogonality between DRMS sequences if there are a large number of transmitted data streams while there is a narrow uplink transmission bandwidth and the DMRS sequences are very short. Especially in MU-MIMO transmission, orthogonality between DMRS sequences can not be ensured if there are different transmission bandwidths of multiplexed users and also their DMRS sequences are different in length. Then an OCC sequence can be introduced and two DMRS sequences of different ports are multiplied by different OCC weights to thereby ensure orthogonality between the DMRS sequences of the different ports. Referring to FIG. 1, a User Equipment (UE) does not know its own transmission mode in use, so a base station has to signal an OCC configuration to the UE. In an SU-MIMO multi-layer transmission mode, one part of DMRS ports of a user are weighted by an OCC of [1 1] (that is, free of OCC weighting), and the other part of the DMRS ports are weighted by an OCC of [1 −1], so that orthogonality of the two parts of the ports can be kept by the OCCs. If this user performs MU-MIMO transmission with another user, respective DMRS ports of the two users can be weighted respectively by [1 1] and [1 −1], so that orthogonality of DMRS sequences between the users can be ensured by the OCCs. This method can also be adopted even if the two users are configured with different bandwidths.

However, in the existing standard, whether to use group hopping or sequence hopping is configured at a cell level, and the use of either of them may result in different base sequences of two slots among DMRS sequences, thus preventing an OCC configuration from being used. In order to enable an OCC configuration be used for a user in need of an OCC function in a cell, hopping configuration has to be notified in the downlink along with a DMRS configuration (including a CS configuration and an OCC configuration) to indicate that a part of users are allowed to be configured separately with a hopping scheme different from a serving cell instead of a slot-level hopping configuration.

Figure 2:
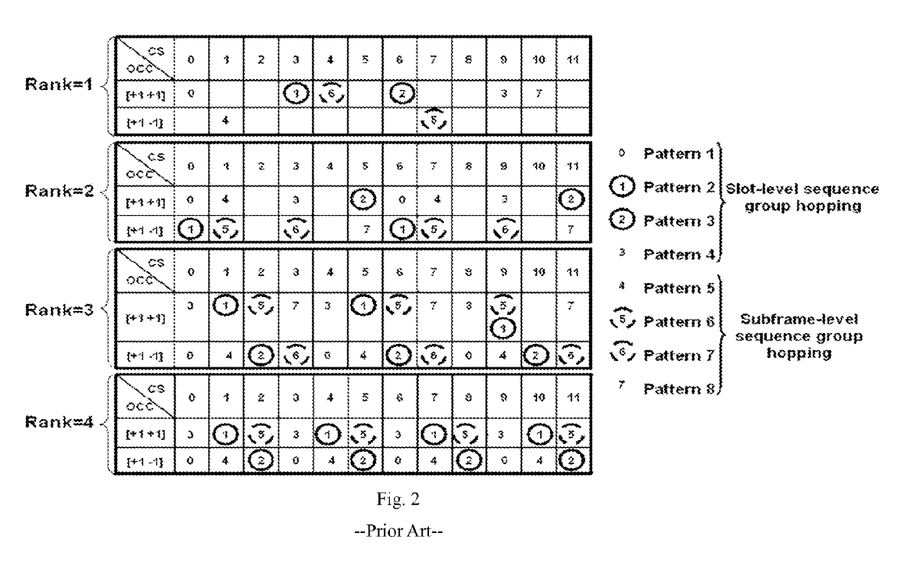
FIG. 2 is a schematic diagram of a DMRS configuration scheme in the prior art.

In the prior art, a method for indicating a CS configuration, an OCC configuration and a hopping configuration concurrently is to bind a CS configuration, an OCC configuration and a hopping configuration with a Rank Indicator (RI) and to define 8 DMRS configurations (including CS configurations, OCC configurations and hopping configurations) for each possible RI (RI=1, 2, 3 and 4). In other words, referring to FIG. 2, a user may transmit each DMRS sequence via a vary number of ports, and the total number of DMRS ports available to a single user is 4 in the existing LTE-A system, so it is required to set corresponding DMRS configurations respectively for the user using one port (i.e., Rank=1), two ports (i.e., Rank=2), three ports (i.e., Rank=3) and four ports (i.e., Rank=4); but the foregoing setting method is too complex in that corresponding DMRS configurations are set for each Rank so that the user has to reload and fetch corresponding DMRS configurations once the Rank in use is changed, thus greatly complicating the execution and increasing an operation load and also lowering the flexibility of a DMRS configuration.

SUMMARY OF THE INVENTION

Embodiments of the invention provide a method, apparatus and system for configuring a DMRS so as to lower the complexity of executing a DMRS configuration flow and alleviate an operation load of a terminal.

The embodiments of the invention provide the following technical solutions.

A method for configuring a Demodulation Reference Signal (DMRS) includes:
  receiving a DMRS indication index transmitted from the network side;
  determining at least one port for local transmission of a DMRS; and
  retrieving preset DMRS configuration parameters corresponding to the DMRS indication index and the at least one port and configuring a DMRS transmitted from the at least one port according to the DMRS configuration parameters.

An apparatus for configuring a Demodulation Reference Signal (DMRS) includes:
  a communicating unit configured to receive a DMRS indication index transmitted from the network side;
  a determining unit configured to determine at least one port for local transmission of a DMRS;
  a retrieving unit configured to retrieve preset DMRS configuration parameters corresponding to the DMRS indication index and the at least one port; and
  a configuring unit configured to configure a DMRS transmitted from the at least one port according to the DMRS configuration parameters.

A system for configuring a Demodulation Reference Signal (DMRS) includes:
  a network side device configured to transmit a DMRS indication index to a UE; and
  the UE configured to receive the DMRS indication index transmitted from the network side, determine at least one port for local transmission of a DMRS, retrieve preset DMRS configuration parameters corresponding to the DMRS indication index and the at least one port, and configure a DMRS transmitted from the at least one port according to the DMRS configuration parameters.

In the embodiments of the invention, upon reception of a DMRS indication index transmitted from the network side, a UE can retrieve preset DMRS configuration parameters corresponding to the DMRS indication index and at least one port for transmission of a DMRS simply with reference to a preset DMRS configuration table and further configure a DMRS without reloading relevant configuration information, thereby lowering the complexity of executing a DMRS configuration flow, alleviating an operation load of the terminal and also improving the flexibility of an application of the DMRS configuration flow.

DETAILED DESCRIPTION OF THE EMBODIMENTS

In order to lower the complexity of executing a DMRS configuration flow and alleviate an operation load of a terminal, an embodiment of the invention provides a method for indicating a CS configuration, an OCC configuration and a hopping configuration jointly, which can indicate a hoping configuration along with a CS configuration and an OCC configuration to a terminal (e.g., a UE) to thereby improve the flexibility of using an OCC without any increase in signalling overhead, and specifically a DMRS indication index transmitted from the network side is received; at least one port for local transmission of a DMRS is determined; and preset DMRS configuration parameters corresponding to the DMRS indication index and the at least one port are retrieved and a DMRS transmitted from the at least one port is configured according to the DMRS configuration parameters.

As can be apparent from the foregoing description, the DMRS configuration parameters corresponding to the DMRS indication index transmitted from the network side and the port for the UE to transmit a DMRS are set in the present embodiment, particularly as depicted in Table 1, Table 2 and Table 3, each of which is referred to as a DMRS configuration table and stored at both the network side and the terminal side. One of Table 1, Table 2 and Table 3 can be selected for use in a specific implementation.

TABLE 1

| | CS configuration parameter | | | | OCC configuration parameter | | | |
|---|---|---|---|---|---|---|---|---|
| Indication index | Port 0 | Port 1 | Port 2 | Port 3 | Port 0 | Port 1 | Port 2 | Port 3 |
| 0 | 0 | 6 | 3 | 9 | 0 | 0 | 0 | 0 |
| 1 | 2 | 8 | 5 | 11 | 0 | 0 | 0 | 0 |
| 2 | 3 | 9 | 0 | 6 | 1 | 1 | 1 | 1 |
| 3 | 4 | 10 | 1 | 7 | 1 | 1 | 1 | 1 |
| 4 | 6 | 0 | 9 | 3 | 1 | 1 | 0 | 0 |
| 5 | 8 | 2 | 11 | 5 | 1 | 1 | 0 | 0 |
| 6 | 9 | 3 | 6 | 0 | 0 | 0 | 1 | 1 |
| 7 | 10 | 4 | 7 | 1 | 0 | 0 | 1 | 1 |

TABLE 2

| | CS configuration parameter | | | | OCC configuration parameter | | | |
|---|---|---|---|---|---|---|---|---|
| Indication index | Port 0 | Port 1 | Port 2 | Port 3 | Port 0 | Port 1 | Port 2 | Port 3 |
| 0 | 0 | 6 | 3 | 9 | 0 | 0 | 0 | 0 |
| 1 | 2 | 8 | 5 | 11 | 0 | 0 | 0 | 0 |
| 2 | 3 | 9 | 0 | 6 | 1 | 1 | 1 | 1 |
| 3 | 4 | 10 | 1 | 7 | 1 | 1 | 1 | 1 |
| 4 | 6 | 0 | 9 | 3 | 1 | 1 | 0 | 0 |
| 5 | 7 | 1 | 10 | 4 | 1 | 1 | 0 | 0 |
| 6 | 9 | 3 | 6 | 0 | 0 | 0 | 1 | 1 |
| 7 | 11 | 5 | 8 | 2 | 0 | 0 | 1 | 1 |

TABLE 3

| | CS configuration parameter | | | | OCC configuration parameter | | | |
|---|---|---|---|---|---|---|---|---|
| Indication index | Port 0 | Port 1 | Port 2 | Port 3 | Port 0 | Port 1 | Port 2 | Port 3 |
| 0 | 1 | 7 | 4 | 10 | 0 | 0 | 0 | 0 |
| 1 | 2 | 8 | 5 | 11 | 0 | 0 | 0 | 0 |
| 2 | 3 | 9 | 0 | 6 | 1 | 1 | 1 | 1 |
| 3 | 4 | 10 | 1 | 7 | 1 | 1 | 1 | 1 |
| 4 | 6 | 0 | 9 | 3 | 1 | 1 | 0 | 0 |
| 5 | 7 | 1 | 10 | 4 | 1 | 1 | 0 | 0 |
| 6 | 10 | 4 | 7 | 1 | 0 | 0 | 1 | 1 |
| 7 | 11 | 5 | 8 | 2 | 0 | 0 | 1 | 1 |

Taking Table 3 as an example, a DMRS indication index defined in the existing standard includes 3 bits, so 8 different DMRS indication indexes, e.g., 0, 1, 2 . . . 7, can be given, and the DMRS indication index can be transmitted from the network side to the UE in a Downlink Control Indication (DCI) field of a downlink control channel (PDCCH).

Referring to Table 3, each indication index corresponds to a series of DMRS configuration parameters including CS configuration parameters, OCC configuration parameters and hopping configuration parameters of respective DMRS ports from the first port to the $N^{th}$ port, where N is the largest number of DMRS ports supported by a user in the uplink, and for the $M^{th}$ DMRS port (M is an integer number and $0 \leq M \leq N$) for transmission by the UE, the UE selects the DMRS configuration parameters corresponding to the $M^{th}$ port according to the indication index to configure the corresponding DMRS port.

Firstly, a CS configuration parameter and an OCC configuration parameter will be introduced. As depicted in Table 3, taking the indication index "0" as an example, the UE receiving the indication index "0", particularly taking the DMRS indication index "0" as an example, the UE receiving the DMRS indication index "0" adopts the following configuration pattern.

For transmission of a DMRS via the port 0, the CS configuration parameter "1" and the OCC configuration parameter "0" are adopted.

For transmission of DMRSs via the port 0 and the port 1, the CS configuration parameter "1" and the OCC configuration parameter "0" are adopted for the port 0; and the CS configuration parameter "7" and the OCC configuration parameter "0" are adopted for the port 1.

For transmission of DMRSs via the port 0, the port 1 and the port 2, the CS configuration parameter "1" and the OCC configuration parameter "0" are adopted for the port 0; the CS configuration parameter "7" and the OCC configuration parameter "0" are adopted for the port 1; and the CS configuration parameter "4" and the OCC configuration parameter "0" are adopted for the port 2.

For transmission of DMRSs via the port 0, the port 1, the port 2 and the port 3, the CS configuration parameter "1" and the OCC configuration parameter "0" are adopted for the port 0; the CS configuration parameter "7" and the OCC configuration parameter "0" are adopted for the port 1; the CS configuration parameter "4" and the OCC configuration parameter "0" are adopted for the port 2; and the CS configuration parameter "10" and the OCC configuration parameter "0" are adopted for the port 3.

In the present embodiment, the OCC configuration parameter includes two types of "0" and "1" to represent two orthogonal OCC configurations respectively, for example, 0 represents [1 1] and 1 represents [1 −1].

Secondly, a hopping configuration parameter will be introduced.

As depicted in Table 3, a corresponding hopping configuration attribute can be set for each indication index dependent upon a practical application context, and the hopping configuration attribute thereof can characterize a corresponding hopping configuration parameter. For example, the indication indexes "0", "2", "4" and "6" have such a hopping configuration attribute that disabling a slot-level group hopping configuration and a slot-level sequence hopping configuration is indicated to the UE; and the indication indexes "1", "3", "5" and "7" have such a hopping configuration attribute that enabling a slot-level group hopping configuration and a slot-level sequence hopping configuration is indicated to the UE. Particularly, a corresponding hopping configuration attribute can be set for each DMRS indication index dependent upon a practical application context. For example, the DMRS indication indexes "0", "2", "4" and "6" have such a hopping configuration attribute that disabling slot-level group hopping and slot-level sequence hopping is indicated to the UE; and the DMRS indication indexes "1", "3", "5" and "7" have such a hopping configuration attribute that enabling slot-level group hopping and/or slot-level sequence hopping is indicated to the UE.

In Table 3, each DMRS port corresponds to one transport data layer (an rank represents the number of a DMRS port/the number of a transport data layer), and apparently in the present embodiment, only one DMRS configuration table can suffice to set all of DMRS configuration parameters corresponding to respective ranks instead of setting corresponding DMRS configuration tables respectively for different numbers of ranks in use.

In a practical application, preferably, one or any combination of the following principles shall be observed in order to achieve good orthogonality during SU-MIMO transmission and also ensure flexibility for MU-MIMO transmission (different numbers of users and different numbers of transport layers).

1) Referring to Table 4 to Table 8, preferably, the CS configuration parameter of the first port (i.e., the port 0) is retrieved directly by mapping the DMRS indication index thereto, and the CS configuration parameters of the other ports (i.e., the port 1, the port 2 and the port 3) are retrieved indirectly from the CS configuration parameter of the first port under a first preset condition.

Referring to Table 4, for example, the CS configuration parameter of the port 0 is retrieved as "2" directly by mapping the DMRS indication index "0" thereto, and the CS configuration parameters of the port 1, the port 2 and the port 3 can be inferred indirectly as "8", "5" and "11" respectively from the CS configuration parameter "2" of the port 0 given the first preset condition specifying that the port 1, the port 2 and the port 3 be spaced in CS configuration from the port 0 by 6, 3 and 9 respectively.

The port 1, the port 2 and the port 3 are spaced in CS configuration from the port 0 by 6, 3 and 9 respectively for the purpose of ensuring sufficiently large distances in CS configuration parameter between the respective ports to accommodate numerous demands for a number of SU-MIMO transport layers during SU-MIMO transmission.

2) Referring to Table 4 to Table 8, preferably, the OCC configuration parameter of the first port (the port 0) is retrieved directly by mapping the DMRS indication index thereto, and the OCC configuration parameters of the other ports (i.e., the port 1, the port 2 and the port 3) are retrieved indirectly from the OCC configuration parameter of the first port under a second preset condition.

Referring to Table 4, for example, the OCC configuration parameter of the port 0 is retrieved as "0" directly by mapping the DMRS indication index "0" thereto, and the OCC configuration parameters of the port 1, the port 2 and the port 3 corresponding to the DMRS indication index 0 can be inferred indirectly as "0", "0" and "0" respectively from the OCC configuration parameter "0" of the port 0 corresponding to the DMRS indication index 0 given the second preset condition specifying that the port 1, the port 2 and the port 3 have the same OCC configuration parameters as that of the port 0 for the DMRS indication indexes 0, 1, 2 and 3 primarily for the purpose of supporting a high-order MU-MIMO scenario; and correspondingly, the OCC configuration parameter of the port 0 is retrieved as "1" directly by mapping the DMRS indication index 1 thereto, and also the OCC configuration parameters of the port 1, the port 2 and the port 3 corresponding to the DMRS indication index 1 can be inferred indirectly as "1", "1" and "1" respectively as specified by the foregoing second preset condition.

Referring to Table 4, in another example, the OCC configuration parameter of the port 0 is retrieved as "0" directly by mapping the DMRS indication index "4" thereto, and the OCC configuration parameter of the port 1 corresponding to the DMRS indication index 4 can be inferred indirectly as "0" and the OCC configuration parameters of the port 2 and the port 3 corresponding to the DMRS indication index 4 as "1" and "1" respectively from the OCC configuration parameter "0" of the port 0 corresponding to the DMRS indication index 4 given the second preset condition further specifying that the port 1 has the same OCC configuration parameter as that of the port 0 and the port 2 and the port 3 have a different OCC configuration parameter from that of the port 0 for the DMRS indication indexes 4, 5, 6 and 7 primarily for the purpose of supporting SU-MIMO transmission and low-order MU-MIMO transmission; and correspondingly, the OCC configuration parameter of the port 0 is retrieved as "1" directly by mapping the DMRS indication index 5 thereto, and also the OCC configuration parameter of the port 1 corresponding to the DMRS indication index 5 can be inferred indirectly as "1" and the OCC configuration parameters of the port 2 and the port 3 corresponding to the DMRS indication index 5 as "0" and "0" respectively as specified by the foregoing second preset condition.

Referring to Table 7, Table 8 and Table 9, the foregoing second preset condition can specify that the DMRS indication indexes 0, 1, 2 and 3 be primarily intended to support high-order MU-MIMO transmission and the indication indexes 4, 5, 6 and 7 be primarily intended for SU-MIMO transmission and low-order MU-MIMO transmission; or can specify that the DMRS indication indexes 0 and 1 be primarily intended to support high-order MU-MIMO transmission and the indication indexes 2, 3, 4, 5, 6 and 7 be primarily intended for SU-MIMO transmission and low-order MU-MIMO transmission, and a specific setting can depend upon a practical application context, and a repeated description thereof will be omitted here.

The specification of the foregoing second preset condition can be summarized as follows.

One part of the DMRS indication indexes in the DMRS configuration table (≤half the total number) are primarily intended to support high-order MU-MIMO transmission (RI (Rank Indicator) >2), where all the ports (including the port 0, the port 1, the port 2 and the port 3) corresponding to each of the part of the DMRS indication indexes have the same OCC configuration parameter; and among this part of the DMRS indication indexes, all the ports corresponding to one half of the DMRS indication indexes have an OCC configuration parameter "0", and all the ports corresponding to the other half of the DMRS indication indexes have an OCC configuration parameter "1", respectively for two groups of multiplexed MU-MIMO users.

The other part of the DMRS indication indexes in the DMRS configuration table (≥half the total number) are primarily intended for SU-MIMO transmission and low-order MU-MIMO transmission (RI≤2), where the first two ports (including the port 0 and the port 1) corresponding to each of the part of the DMRS indication indexes adopt a different OCC configuration parameter from that of the last two ports (including the port 2 and the port 3), and among this part of the DMRS indication indexes, the number of DMRS indication indexes of the first two ports with a corresponding OCC configuration parameter "0" is the same as, the number of DMRS indication indexes of the first two ports with a corresponding OCC configuration parameter "1"; and as depicted in Table 3, the port 0 and the port 1 corresponding to the DMRS indication indexes 4 and 5 have an OCC configuration parameter "1", and the port 2 and the port 3 corresponding to the DMRS indication indexes 4 and 5 have an OCC configuration parameter "0", and the port 0 and the port 1 corresponding to the DMRS indication indexes 6 and 7 have an OCC configuration parameter "0", and the port 2 and the port 3 corresponding to the DMRS indication indexes 6 and 7 have an OCC configuration parameter "1", and such setting has such a benefit that orthogonality between transport layers can be improved by an OCC during SU-MIMO transmission with rank=¾ by the user. Configuration patterns in Table 4 to Table 8 are similar to that in Table 3, and a repeated description thereof will be omitted here.

In the DMRS configuration table defined under the second preset condition, the first two ports always have the same OCC configuration parameter, so an indication index of SU-MIMO is not distinguished from that of MU-MIMO in transmission with rank equal to or less than 2 by the user, that is, the indication index of SU-MIMO can also be used for MU-MIMO, and the indication index of MU-MIMO can also be used for SU-MIMO, thereby improving an application scope and the flexibility in configuration of the DMRS configuration table.

3) Preferably, a mapping relationship between a DMRS indication index and a CS configuration parameter in an LTE system can be adopted as the mapping relationship between the DMRS indication index and the CS configuration parameter of the first port (i.e., the port 0), as depicted in Table 5, where the CS configuration parameters of the ports 0 corresponding to the DMRS indication indexes "0, 1, 2, 3, 4, 5, 6 and 7" are "0, 6, 3, 4, 2, 8, 10 and 9" respectively, and this can ensure backward compatibility of the DMRS configuration table; or a configuration pattern newly defined in an LTE-A system can be adopted, as depicted in Table 4, where the CS configuration parameters of the ports 0 corresponding to the DMRS indication indexes "0, 1, 2, 3, 4, 5, 6 and 7" are "2, 4, 1, 3, 11, 7, 10 and 6" respectively.

4) In the present embodiment, the mapping relationship between the DMRS indication index and the OCC configuration parameter of the first port (i.e., the port 0) can be set that one type of OCC configuration parameter is adopted for odd indexes, and the other type of OCC configuration parameter is adopted for even indexes; and referring to Table 4, for example, the OCC configuration parameters of the ports 0 corresponding to the DMRS indication indexes 1, 3, 5 and 7 are 1, and the OCC configuration parameters of the ports 0 corresponding to the DMRS indication indexes 2, 4, 6 and 8 are 0; or that the first half of the indexes correspond to a OCC configuration parameter different from that of the last half of the indexes, for example, the OCC configuration parameters of the ports 0 corresponding to the DMRS indication indexes 0, 1, 2 and 3 are 0, and the OCC configuration parameters of the ports 0 corresponding to the DMRS indication indexes 4, 5, 6 and 7 are 1.

In a practical application, of course, the mapping relationship between various values of the DMRS indication index and the OCC configuration parameters of the ports 0 can alternatively be configured in other patterns, and the mapping relationship is particularly as depicted in Table 3, a repeated description of which will be omitted here.

5) In the DMRS configuration table, the DMRS indication indexes are divided into two parts by the hopping configuration attributes so that the first part of the DMRS indication indexes indicate enabling slot-level group hopping and/or slot-level sequence hopping and the second part of the DMRS indication indexes indicate disabling slot-level group hopping and slot-level sequence hopping in a first case; and the same hopping configuration attribute is set for all the DMRS indication indexes in a second case. In the present embodiment, a case where a slot-level hopping configuration is disabled will be defined, but whether to enable a non-slot-level hopping configuration will not be defined.

In the first case, for example, referring to Table 4 to Table 6, all the hopping configuration attributes which are set in Table 4 for the DMRS indication indexes 0, 1, 4 and 5, the hopping configuration attributes which are set in Table 5 for the DMRS indication indexes 2, 3, 4 and 5 and the hopping configuration attributes which are set in Table 6 for the DMRS indication indexes 2, 3, 4, 5 and 6 refer to that enabling slot-level group hopping or enabling slot-level sequence hopping or enabling slot-level group hopping and slot-level sequence hopping is indicated to the UE. All the hopping configuration attributes which are set in Table 4 for the DMRS indication indexes 2, 3, 6 and 7, the hopping configuration attributes which are set in Table 5 for the DMRS indication indexes 0, 1, 6 and 7 and the hopping configuration attributes which are set in Table 6 for the DMRS indication indexes 0 and 1 refer to that disabling slot-level group hopping and slot-level sequence hopping is indicated to the UE.

When a cell-specific hopping configuration indicates disabling group hopping and sequence hopping, the UE determines by default that indicated contents of the 3-bit data included in the DMRS indication index are intended for a case where group hopping and sequence hopping are absent, regardless of hopping configuration attribute corresponding to the DMRS indication index; and when the cell-specific hopping configuration indicates enabling group hopping and sequence hopping, the UE determines that slot-level group hopping is enabled or slot-level sequence hopping is enabled or slot-level group hopping and slot-level sequence hopping are enabled or slot-level group hopping and slot-level sequence hopping are disabled according to the hopping configuration attribute corresponding to the DMRS indication index.

In the second case, in another example, the same hopping configuration attribute is set for all the DMRS indication indexes, and a specific hopping configuration pattern represented by the hopping configuration attribute is indicated in a cell-specific hopping configuration or indicated in additional high layer signalling or indicated in a cell-specific hopping configuration and additional high layer signalling (additional high layer signalling is used for the purpose of distinguishing because the cell-specific hopping configuration is also high layer signalling). As depicted in Table 7, Table 8 and Table 9, when the cell-specific hopping configuration indicates disabling group hopping and sequence hopping, the UE determines by default that indicated contents of the 3-bit data included in the DMRS indication index are intended for a case where group hopping and sequence hopping are absent; and when the cell-specific hopping configuration indicates enabling group hopping or sequence hopping, the UE determines by default that indicated contents of the 3-bit data included in the DMRS indication index are intended for a case where group hopping or sequence hopping is present; or additional high layer signalling determines that the respective DMRS indication indexes with the same hopping configuration attribute enable slot-level group hopping or enable slot-level sequence hopping or enable slot-level group hopping and slot-level sequence hopping or disable slot-level group hopping and slot-level sequence hopping, and no relevant information is contained in the DMRS configuration table.

Under the foregoing principles 1) to 5), a special configuration principle can be further added for a specific DMRS configuration table in a practical application, and one or any combination of the following principles can be added by taking Table 3 as an example.

6) The CS configuration parameters of the ports 0 corresponding to the different DMRS indication indexes are different, and it is ensured a configuration of the respective CS configuration parameters in a reversed order can also appear in the table, that is, a configuration of the CS configuration parameters of all the ports corresponding to any DMRS indication index corresponds to another DMRS indication index, thus facilitating formation of a complementary structure during MU-MIMO transmission to ensure CS orthogonality. As depicted in Table 3, the CS configuration parameters of the port 0 to the port 3 corresponding to the DMRS indication index 0 are "1", "7", "4" and "10" respectively, and then its configuration in a reversed order, "10", "4", "7" and "1" will also be configured to correspond to the DMRS indication index 6.

7) For the DMRS indication indexes with the same hopping configuration attribute (e.g., the DMRS indication indexes 1, 3, 5 and 7 in Table 3), the distance between the ports 0 corresponding thereto shall be maximized (without any influence on the other attributes), and taking as an example MU-MIMO transmission with rank=1 for which no OCC configuration parameter is used (2 to 4 users as a common MU-MIMO), for example, the CS configuration parameters of four ports 0 corresponding to the DMRS indication indexes 1, 3, 5 and 7 in Table 3 take values of 2, 4, 7 and 11 respectively spaced by an amount sufficient to ensure the performance of channel estimation.

8) The CS configuration parameter and the OCC configuration parameter are taken in conjunction in order to ensure flexibility during MU-MIMO transmission, that is, for the DMRS indexes with the same hopping configuration attribute (e.g., the DMRS indication indexes 0, 2, 4 and 6 or the DMRS indication indexes 1, 3, 5 and 7 in Table 3), the CS configuration parameters corresponding to the DMRS indexes of the first two ports with the same OCC configuration parameter are in a reversed relationship to ensure a sufficiently large distance between the CS configuration parameters during low-order MU-MIMO transmission with RI≤2, thereby ensuring CS orthogonality. As depicted in Table 3, the OCC configuration parameters of the port 0 and the port 1 corresponding to the DMRS indication indexes 2 and 4 are 1, so the CS configuration parameters corresponding to the DMRS indication index 2 are 3, 9, 0 and 6, and the CS configuration parameters corresponding to the DMRS indication index 4 are 6, 0, 9 and 3, right in a reversed relationship, and this reversed relationship also holds for the other DMRS indication indexes, e.g., 3 and 5, 1 and 7, and 0 and 6.

TABLE 4

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 0 | 2 | 8 | 5 | 11 | 0 | 0 | 0 | 0 |
| 1 | 4 | 10 | 7 | 1 | 1 | 1 | 1 | 1 |
| 2 | 1 | 7 | 4 | 10 | 0 | 0 | 0 | 0 |
| 3 | 3 | 9 | 6 | 0 | 1 | 1 | 1 | 1 |

TABLE 4-continued

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 4 | 11 | 5 | 2 | 8 | 0 | 0 | 1 | 1 |
| 5 | 7 | 1 | 10 | 4 | 1 | 1 | 0 | 0 |
| 6 | 10 | 4 | 1 | 7 | 0 | 0 | 1 | 1 |
| 7 | 6 | 0 | 9 | 3 | 1 | 1 | 0 | 0 |

TABLE 5

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 0 | 0 | 6 | 3 | 9 | 0 | 0 | 0 | 0 |
| 1 | 6 | 0 | 9 | 3 | 1 | 1 | 1 | 1 |
| 2 | 3 | 9 | 6 | 0 | 0 | 0 | 0 | 0 |
| 3 | 4 | 10 | 7 | 1 | 1 | 1 | 1 | 1 |
| 4 | 2 | 8 | 5 | 11 | 0 | 0 | 1 | 1 |
| 5 | 8 | 2 | 11 | 5 | 1 | 1 | 0 | 0 |
| 6 | 10 | 4 | 1 | 7 | 0 | 0 | 1 | 1 |
| 7 | 9 | 3 | 0 | 6 | 1 | 1 | 0 | 0 |

TABLE 6

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 0 | 0 | 6 | 3 | 9 | 0 | 0 | 0 | 0 |
| 1 | 6 | 0 | 9 | 3 | 1 | 1 | 1 | 1 |
| 2 | 3 | 9 | 6 | 0 | 0 | 0 | 0 | 0 |
| 3 | 4 | 10 | 7 | 1 | 1 | 1 | 1 | 1 |
| 4 | 2 | 8 | 5 | 11 | 0 | 0 | 1 | 1 |
| 5 | 8 | 2 | 11 | 5 | 1 | 1 | 0 | 0 |
| 6 | 10 | 4 | 1 | 7 | 0 | 0 | 1 | 1 |
| 7 | 9 | 3 | 0 | 6 | 1 | 1 | 0 | 0 |

TABLE 7

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 0 | 0 | 6 | 3 | 9 | 0 | 0 | 0 | 0 |
| 1 | 6 | 0 | 9 | 3 | 1 | 1 | 1 | 1 |
| 2 | 3 | 9 | 6 | 0 | 0 | 0 | 0 | 0 |
| 3 | 4 | 10 | 7 | 1 | 1 | 1 | 1 | 1 |
| 4 | 2 | 8 | 5 | 11 | 0 | 0 | 1 | 1 |
| 5 | 8 | 2 | 11 | 5 | 1 | 1 | 0 | 0 |
| 6 | 10 | 4 | 1 | 7 | 0 | 0 | 1 | 1 |
| 7 | 9 | 3 | 0 | 6 | 1 | 1 | 0 | 0 |

TABLE 8

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 0 | 0 | 6 | 3 | 9 | 0 | 0 | 0 | 0 |
| 1 | 6 | 0 | 9 | 3 | 1 | 1 | 1 | 1 |
| 2 | 3 | 9 | 6 | 0 | 0 | 0 | 1 | 1 |
| 3 | 4 | 10 | 7 | 1 | 1 | 1 | 0 | 0 |
| 4 | 2 | 8 | 5 | 11 | 0 | 0 | 1 | 1 |
| 5 | 8 | 2 | 11 | 5 | 1 | 1 | 0 | 0 |

TABLE 8-continued

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 6 | 10 | 4 | 1 | 7 | 0 | 0 | 1 | 1 |
| 7 | 9 | 3 | 0 | 6 | 1 | 1 | 0 | 0 |

TABLE 9

| Indication index | CS configuration parameter | | | | OCC configuration parameter | | | |
|---|---|---|---|---|---|---|---|---|
| | Port 0 | Port 1 | Port 2 | Port 3 | Port 0 | Port 1 | Port 2 | Port 3 |
| 0 | 0 | 6 | 3 | 9 | 0 | 0 | 1 | 1 |
| 1 | 6 | 0 | 9 | 3 | 1 | 1 | 0 | 0 |
| 2 | 3 | 9 | 6 | 0 | 1 | 1 | 0 | 0 |
| 3 | 4 | 10 | 7 | 1 | 0 | 0 | 0 | 0 |
| 4 | 2 | 8 | 5 | 11 | 0 | 0 | 0 | 0 |
| 5 | 8 | 2 | 11 | 5 | 1 | 1 | 1 | 1 |
| 6 | 10 | 4 | 1 | 7 | 1 | 1 | 1 | 1 |
| 7 | 9 | 3 | 0 | 6 | 0 | 0 | 1 | 1 |

In the embodiments of the invention, the foregoing DMRS configuration tables can be applicable to uplink transmission for any number of antennas and antenna array (e.g., a linear array, a polarized array), any duplex system (a TDD system or an FDD system) and any transmission mode (e.g., SU-MIMO, MU-MIMO and CoMP). Furthermore, contents of DMRS configuration parameters corresponding to different DMRS indication indexes in a preset DMRS configuration table can be interchangeable as long as they do not go beyond the range of the DMRS configuration table.

Preferred embodiments of the invention will be detailed below with reference to the drawings based upon the DMRS configuration table which is set as above.

Figure 3:
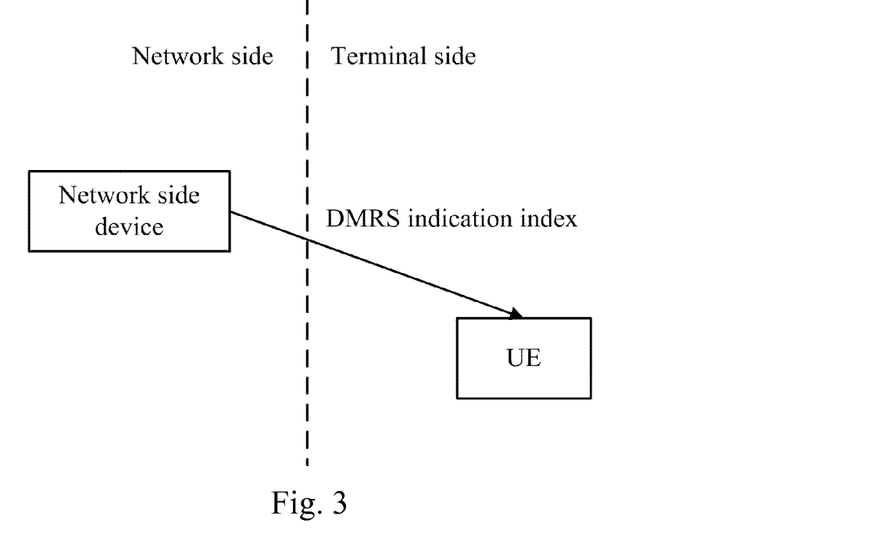
FIG. 3 is an architectural diagram of a system for configuring a DMRS in an embodiment of the invention.

Referring to FIG. 3, a system for configuring a DMRS in an embodiment of the invention includes a network side device and a UE, where:

the network side device is configured to transmit a DMRS indication index to the UE; and the UE is configured to receive the DMRS indication index transmitted from the network side, determine at least one port for local transmission of a DMRS, retrieve preset DMRS configuration parameters corresponding to the DMRS indication index and the at least one port, and configure a DMRS transmitted from the at least one port according to the DMRS configuration parameters.

Figure 4:
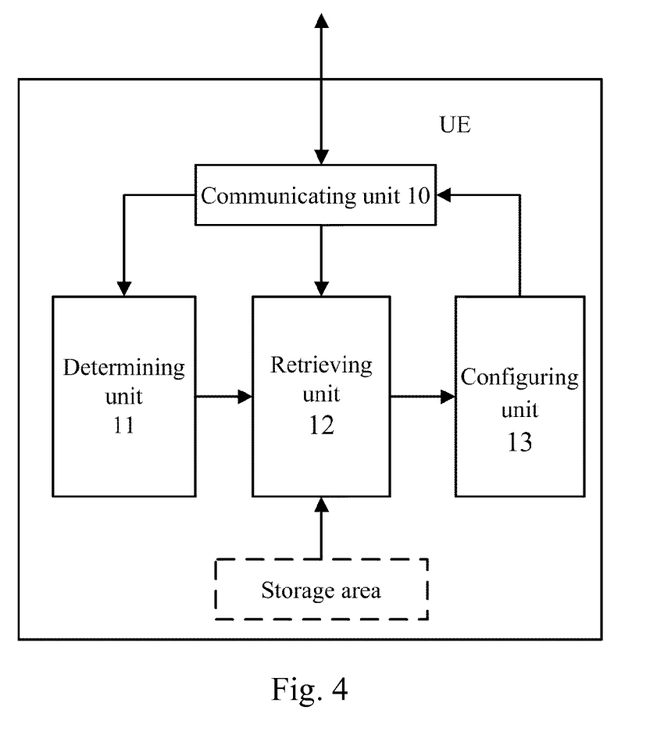
FIG. 4 is an architectural diagram of an apparatus for configuring a DMRS in an embodiment of the invention.

Referring to FIG. 4, an apparatus for configuring a DMRS in an embodiment of the invention, e.g., a UE, includes a communicating unit 10, a determining unit 11, an retrieving unit 12 and a configuring unit 13, where:

the communicating unit 10 is configured to receive a DMRS indication index transmitted from the network side;

the determining unit 11 is configured to determine at least one port for local transmission of a DMRS;

the retrieving unit 12 is configured to retrieve preset DMRS configuration parameters corresponding to the DMRS indication index and the at least one port; and the configuring unit 13 is configured to configure a DMRS transmitted from the at least one port according to the DMRS configuration parameters.

As illustrated in FIG. 4, the foregoing apparatus further includes a setting unit 14 configured to set DMRS configuration parameters corresponding to a DMRS indication index and a port in use under one or any combination of the foregoing principles 1) to 5).

Figure 5:
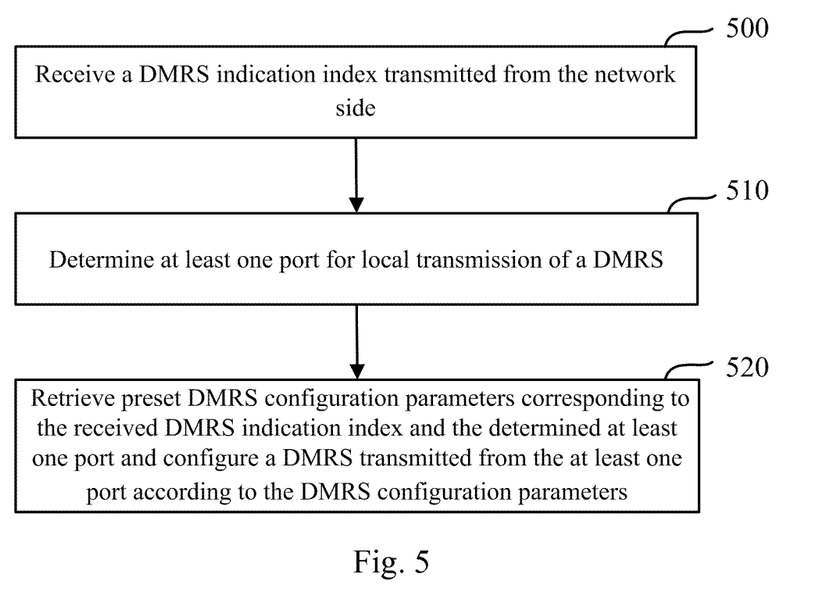
FIG. 5 is a flow chart of configuring a DMRS in an embodiment of the invention.

Based upon the foregoing idea, referring to FIG. 5, a detailed flow for a UE to configure a local DMRS according to a DMRS indication index transmitted from a network side device in an embodiment of the invention is as follows.

The step 500 is to receive a DMRS indication index transmitted from the network side.

In a practical application, the DMRS indication index contains 3 bits which can represent 8 different configurations.

The step 510 is to determine at least one port for local transmission of a DMRS.

The UE can determine the number of DMRS ports used by itself according to local configuration information, i.e., the number of ranks used to transmit a DMRS, where one port corresponds to one rank.

The step 520 is to retrieve preset DMRS configuration parameters corresponding to the received DMRS indication index and the determined at least one port and to configure a DMRS transmitted from the at least one port according to the DMRS configuration parameters.

In the present embodiment, two cases are involved when the step 520 is performed.

In a first case, the UE determines one port for local transmission of a DMRS and then retrieves preset DMRS configuration parameters corresponding to the obtained DMRS indication index and the one port and configures a DMRS transmitted from the one port according to the DMRS configuration parameters. For example, when it is determined that the DMRS indication index is 1 and the UE uses the port 0 locally, a DMRS transmitted from the port 0 is configured according to DMRS configuration parameters (including a CS configuration parameter, an OCC configuration parameter and a hopping configuration attribute) which are set in Table 3 for the DMRS indication index 1 and the port 0.

In a second case, the UE determines at least two ports for local transmission of a DMRS and then retrieves preset DMRS configuration parameters respectively corresponding to the obtained DMRS indication index and each of the determined at least two ports and configures a DMRS transmitted from the each port according to the DMRS configuration parameters of the corresponding port. For example, when it is determined that the DMRS indication index is 1 and the UE uses the ports 0 and 1 locally, a DMRS transmitted from the port 0 is configured according to DMRS configuration parameters (including a CS configuration parameter, an OCC configuration parameter and a hopping configuration parameter) which are set in Table 3 for the DMRS indication index 1 and the port 0, and so on, a repeated description of which will be omitted here.

In the foregoing embodiment, the UE can retrieve the hopping configuration parameter among the preset DMRS configuration parameters corresponding to the DMRS indication index and the at least one port in numerous implementations.

For example, the UE can decide its own hopping configuration parameter with reference to a hopping configuration pattern of its serving cell as follows.

The UE determines that the hopping configuration pattern of its serving cell disables a group hopping configuration and a sequence hopping configuration and then determines that the retrieved hopping configuration parameter indicates disabling group hopping and sequence hopping configurations. That is, when the UE determines that the serving cell disables a group hopping configuration and a sequence hopping configuration, the UE will disable group hopping or sequence hopping during local transmission of a DMRS even if the received DMRS indication index is "1", "3", "5" or "7" as depicted in Table 3 (the hopping configuration attribute indicates enabling a slot-level group hopping configuration and a slot-level sequence hopping configuration to the UE).

The UE determines that the hopping configuration pattern of its serving cell enables group hopping and sequence hopping configurations and then determines that the retrieved hopping configuration parameter indicates use of a slot-level group hopping configuration and a slot-level sequence hopping configuration or indicates no use of a slot-level group hopping configuration and a slot-level sequence hopping configuration according to the hopping configuration attribute preset for the received DMRS indication index. According to the hopping configuration attribute preset for the received DMRS indication index, it is determined that the DMRS indication index indicates enabling slot-level group hopping or enabling slot-level sequence hopping or enabling slot-level group hopping and slot-level sequence hopping or disabling slot-level group hopping or slot-level sequence hopping. That is, the UE determines that the serving cell enables a group hopping configuration and a sequence hopping configuration and then determines the hopping configuration pattern according to the hopping configuration attribute corresponding to the received DMRS indication index. For example, if the DMRS indication index 1, 3, 5 or 7 depicted in Table 3 is received, it means that the retrieved hopping configuration parameter indicates enabling a slot-level group hopping configuration and a slot-level sequence hopping configuration, and if the DMRS indication index 0, 2, 4 or 6 depicted in Table 3 is received, it means that the retrieved hopping configuration parameter indicates disabling a slot-level group hopping configuration and a slot-level sequence hopping configuration, and only disabling a slot-level group hopping configuration and a slot-level sequence hopping configuration is defined here, but whether to enable a non-slot-level group hopping configuration and a non-slot-level sequence hopping configuration will not be defined and can be set otherwise dependent upon a specific application context.

Alternatively, the UE determines that the configuration pattern of its serving cell enables group hopping and sequence hopping and then determines that the DMRS indication index indicates enabling slot-level group hopping or enabling slot-level sequence hopping or enabling slot-level group hopping and slot-level sequence hopping or disabling slot-level group hopping and slot-level sequence hopping according to the hopping configuration attribute preset for the received DMRS indication index. That is, the UE determines that the serving cell enables group hopping and sequence hopping and then determines the hopping configuration pattern according to the hopping configuration attribute corresponding to the received DMRS indication index. For example, if the DMRS indication index 1, 3, 5 or 7 depicted in Table 3 is received, it means that the retrieved DMRS indication index indicates enabling slot-level group hopping or enabling slot-level sequence hopping or enabling slot-level group hopping and slot-level sequence hopping, and if the DMRS indication index 0, 2, 4 or 6 depicted in Table 3 is received, it means that the retrieved DMRS indication index indicates disabling slot-level group hopping and slot-level sequence hopping, and only disabling slot-level group hopping and slot-level sequence hopping is defined here, but whether to enable non-slot-level group hopping and non-slot-level sequence hopping will not be defined and can be set otherwise dependent upon a specific application context.

In another example, the UE can decide its own hopping configuration parameter directly according to the hopping configuration attribute of the retrieved DMRS indication index without reference to a hopping configuration pattern of its serving cell. For example, if the DMRS indication index 1, 3, 5 or 7 depicted in Table 3 is received, it means that the retrieved hopping configuration parameter indicates enabling a slot-level group hopping configuration and a slot-level sequence hopping configuration or can alternatively mean that the retrieved DMRS indication index indicates enabling slot-level group hopping or enabling slot-level sequence hopping or enabling slot-level group hopping and slot-level sequence hopping.

In summary, there is provided in an embodiment of the invention a method for indicating a CS configuration parameter, an OCC configuration parameter and a hopping configuration parameter jointly, which can be applicable to various different SU-MIMO and MU-MIMO scenarios at improved flexibility of uplink transmission without any additional increase in signalling overhead. It is possible to support indications of an OCC configuration parameter and a hopping configuration parameter in various scenarios including high-order MU-MIMO and unequal-bandwidth MU-MIMO (only MU-MIMO is supported in the prior art); furthermore, with a DMRS configuration table which is set in the embodiment of the invention, DMRS configuration parameters needed for different ranks can be covered by a few parameters to thereby lower the complexity of a configuration; and upon reception of a DMRS indication index transmitted from the network side, a UE can retrieve preset DMRS configuration parameters corresponding to the DMRS indication index and at least one port for transmission of a DMRS simply with reference to the preset DMRS configuration table and further configure a DMRS without reloading relevant configuration information, thereby lowering the complexity of executing a DMRS configuration flow, alleviating an operation load of the terminal and also improving the flexibility of an application of the DMRS configuration flow.

Those skilled in the art shall appreciate that the embodiments of the invention can be embodied as a method, a system or a computer program product. Therefore, the invention can be embodied in the form of an all-hardware embodiment, an all-software embodiment or an embodiment of software and hardware in combination. Furthermore, the invention can be embodied in the form of a computer program product embodied in a computer useable storage medium (including but not limited to a disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable data processing device provide steps for performing the functions specified in the flow(s) of the flow chart and/or the block(s) of the block diagram.

Evidently those skilled in the art can make various modifications and variations to the invention without departing from the scope of the invention. Thus the invention is also intended to encompass these modifications and variations thereto so long as the modifications and variations come into the scope of the claims appended to the invention and their equivalents.

The invention claimed is:

1. A method for configuring a Demodulation Reference Signal, DMRS, comprising:

storing, by a mobile device, a data structure including a plurality of indication indices and a plurality of DMRS configuration parameter sets, each indication index of the plurality of indication indices mapped to a respective DMRS configuration parameter set of the plurality of DMRS configuration parameter sets, and each DMRS configuration parameter set indicative of Cyclic Shift (CS) configuration parameters, Orthogonal Cover Code (OCC) configuration parameters and hopping configuration parameters for each of N DMRS ports, wherein N is the maximum number of DMRS ports supported by the mobile device, and wherein the hopping parameter is indicative of either enabling at least one of slot-level group hopping and slot-level sequence hopping or disabling slot-level group hopping and slot-level sequence hopping;

receiving, by the mobile device, a DMRS indication index transmitted from a network side, the DMRS indication index corresponding to one of the plurality of indication indices of the data structure;

determining, by the mobile device, at least one port of the N DMRS ports for local transmission of a DMRS; and retrieving, by the mobile device from the stored data structure, DMRS configuration parameters corresponding to the DMRS indication index and the at least one determined port; and configuring, by the mobile device, the DMRS for transmission via the at least one determined port according to the retrieved DMRS configuration parameters.

2. The method according to claim 1, wherein retrieving DMRS configuration parameters corresponding to the DMRS indication index and the at least one port and configuring the DMRS for transmission via the at least one determined port according to the DMRS configuration parameters comprises:

determining one port for local transmission of a DMRS and then retrieving DMRS configuration parameters corresponding to the DMRS indication index and the one port and configuring a DMRS for transmission via the one port according to the DMRS configuration parameters; or determining at least two ports for local transmission of a DMRS and then retrieving DMRS configuration parameters respectively corresponding to the DMRS indication index and each of the at least two ports, and configuring a DMRS for transmission via each port of the at least two ports according to the DMRS configuration parameters of that port.

3. The method according to claim 2, wherein retrieving DMRS configuration parameters corresponding to the DMRS indication index and the at least one determined port comprise:

retrieving a CS configuration parameter, an OCC configuration parameter and a hopping configuration parameter corresponding to the DMRS indication index and the at least one port.

4. The method according to claim 1, wherein after retrieving the DMRS configuration parameters corresponding to the DMRS indication index and the at least one determined port, the method further comprises:

determining that the DMRS indication index indicates disabling group hopping and sequence hopping upon determining that a serving cell disables group hopping and sequence hopping; or determining that the DMRS indication index indicates enabling slot-level group hopping or enabling slot-level sequence hopping or enabling slot-level group hopping and slot-level sequence hopping or disabling slot-level group hopping and slot-level sequence hopping according to the hopping configuration attribute preset for the DMRS indication index upon determining that a serving cell enables group hopping and sequence hopping.

5. The method according to claim 1, wherein after retrieving the DMRS configuration parameters corresponding to the DMRS indication index and the at least one determined port, the method further comprises:

determining that the DMRS indication index indicates enabling slot-level group hopping or enabling slot-level sequence hopping or enabling slot-level group hopping and slot-level sequence hopping or disabling slot-level group hopping and slot-level sequence hopping according to the hopping configuration attribute preset for the DMRS indication index.

6. The method according to claim 1, wherein retrieving DMRS configuration parameters includes:

retrieving a CS configuration parameter of a first port directly by mapping the DMRS indication index thereto, and retrieving a CS configuration parameter of a second port distinct from the first port indirectly based on the CS configuration parameter of the first port under a first preset condition; and retrieving an OCC configuration parameter of a first port directly by mapping the DMRS indication index thereto, and retrieving an OCC configuration parameter of a second port distinct from the first port indirectly based on the OCC configuration parameter of the first port under a second preset condition.

7. The method according to claim 6, wherein:

the first preset condition is that the CS configuration parameter of the second port is calculated from a preset distance by which the CS configuration parameter of the second port is spaced from the CS configuration parameter of the first port; and the second preset condition is that among ports corresponding to a specified part of DMRS indication indexes, the OCC configuration parameters of the second port is the same as that of the first port, and among ports corresponding to another part distinct from the specified part of DMRS indication indexes except the first port, the OCC configuration parameter of the second port is the same as that of the first port, and an OCC configuration parameter of a port distinct from the second port is different from that of the first port.

8. An apparatus for configuring a Demodulation Reference Signal, DMRS, comprising:

a memory for storing a data structure including a plurality of indication indices and a plurality of DMRS configuration parameter sets, each indication index of the plurality of indication indices mapped to a respective DMRS configuration parameter set of the plurality of DMRS configuration parameter sets, and each DMRS configuration parameter set indicative of Cyclic Shift (CS) configuration parameters, Orthogonal Cover Code (OCC) configuration parameters and hopping configuration parameters for each of N DMRS ports, wherein N is the maximum number of DMRS ports supported by the apparatus, and the hopping parameter is indicative of either enabling at least one of slot-level group hopping and slot-level sequence hopping or disabling slot-level group hopping and slot-level sequence hopping; and at least one processor communicatively connected with the memory; wherein the memory is further configured to store instructions executable by the at least one processor, wherein the execution of the instructions by the at least one processor causes the at least one processor to:

receive a DMRS indication index transmitted from a network side, the DMRS indication index corresponding to one of the plurality of indication indices of the data structure;

determine at least one port of the N DMRS ports for local transmission of a DMRS;

retrieve, from the data structure stored in the memory, DMRS configuration parameters corresponding to the DMRS indication index and the at least one determined port by retrieving a CS configuration parameter, an OCC configuration parameter and a hopping configuration parameter corresponding to the DMRS indication index and the at least one determined port; and configure the DMRS for transmission via the at least one determined port according to the DMRS configuration parameters.

9. The apparatus according to claim 8, wherein the execution of the instructions by the at least one processor further causes the at least one processor to:

determine one port for local transmission of the DMRS and then retrieve DMRS configuration parameters corresponding to the DMRS indication index and the one port, and configure the DMRS for transmission via the one port according to the DMRS configuration parameters; or determine at least two ports for local transmission of a DMRS and then retrieve DMRS configuration parameters respectively corresponding to the DMRS indication index and each of the at least two ports, and configure a DMRS for transmission via the each of the at least two ports according to the DMRS configuration parameters of each corresponding port.

10. The apparatus according to claim 9, wherein the execution of the instructions by the at least one processor further causes the at least one processor to retrieve DMRS configuration parameters corresponding to the DMRS indication index and the at least determined one port by retrieving a preset CS configuration parameter, an OCC configuration parameter and a hopping configuration parameter corresponding to the DMRS indication index and the at least one port.

11. The apparatus according to claim 8, wherein the execution of the instructions by the at least one processor further causes the at least one processor to determine that the DMRS indication index indicates disabling group hopping and sequence hopping upon determining that a serving cell disables group hopping and sequence hopping; or determine that the DMRS indication index indicates enabling slot-level group hopping or enabling slot-level sequence hopping or enabling slot-level group hopping and slot-level sequence hopping or disabling slot-level group hopping and slot-level sequence hopping according to the hopping configuration attribute preset for the DMRS indication index upon determining that a serving cell enables group hopping and sequence hopping.

12. The apparatus according to claim 8, wherein the execution of the instructions by the at least one processor further causes the at least one processor to determine that the DMRS indication index indicates enabling slot-level group hopping or enabling slot-level sequence hopping or enabling slot-level group hopping and slot-level sequence hopping or disabling slot-level group hopping and slot-level sequence hopping according to the hopping configuration attribute preset for the DMRS indication index.

13. The apparatus according to claim 8, wherein the execution of the instructions by the at least one processor further causes the at least one processor to:

retrieve a CS configuration parameter of a first port directly by mapping the DMRS indication index thereto, and retrieve a CS configuration parameter of a second port distinct from the first port indirectly based on the CS configuration parameter of the first port under a first preset condition; and retrieve an OCC configuration parameter of a first port directly by mapping the DMRS indication index thereto, and retrieve an OCC configuration parameter of a second port distinct from the first port indirectly based on the OCC configuration parameter of the first port under a second preset condition.

14. The apparatus according to claim 13, wherein:
the first preset condition is that the CS configuration parameter of the second port is calculated from a preset distance by which the CS configuration parameter of the second port is spaced from the CS configuration parameter of the first port; and the second preset condition is that among ports corresponding to a specified part of DMRS indication indexes, the OCC configuration parameter of the second port is the same as that of the first port, and among ports corresponding to another part than the specified part of DMRS indication indexes except the first port, an OCC configuration parameter of the second port is the same as that of the first port, and an OCC configuration parameter of a port distinct from the second port is different from that of the first port.

15. A system for configuring a Demodulation Reference Signal, DMRS, comprising:

a network side device configured to transmit a DMRS indication index to a UE; and the UE configured to:

store a data structure including a plurality of indication indices and a plurality of DMRS configuration parameter sets, each indication index of the plurality of indication indices mapped to a respective DMRS configuration parameter set of the plurality of DMRS configuration parameter sets, and each DMRS configuration parameter set indicative of Cyclic Shift (CS) configuration parameters, Orthogonal Cover Code (OCC) configuration parameters and hopping configuration parameters for each of N DMRS ports, wherein N is the maximum number of DMRS ports supported by the UE, and wherein the hopping parameter is indicative of either enabling at least one of slot-level group hopping and slot-level sequence hopping or disabling slot-level group hopping and slot-level sequence hopping;

receive the DMRS indication index transmitted from the network side, the DMRS indication index corresponding to one of the plurality of indication indices of the data structure;

determine at least one port of the N DMRS ports for local transmission of a DMRS;

retrieve from the data structure DMRS configuration parameters corresponding to the DMRS indication index and the at least one determined port by retrieving a CS configuration parameter, an OCC configuration parameter and a hopping configuration parameter corresponding to the DMRS indication index and the at least one determined port; and configure a DMRS for transmission via the at least one determined port according to the DMRS configuration parameters.

* * * * *